Oct. 14, 1941.   T. A. STEHLIN   2,259,184
BRAKE CONTROL VALVE MECHANISM
Filed Oct. 5, 1939   2 Sheets-Sheet 1
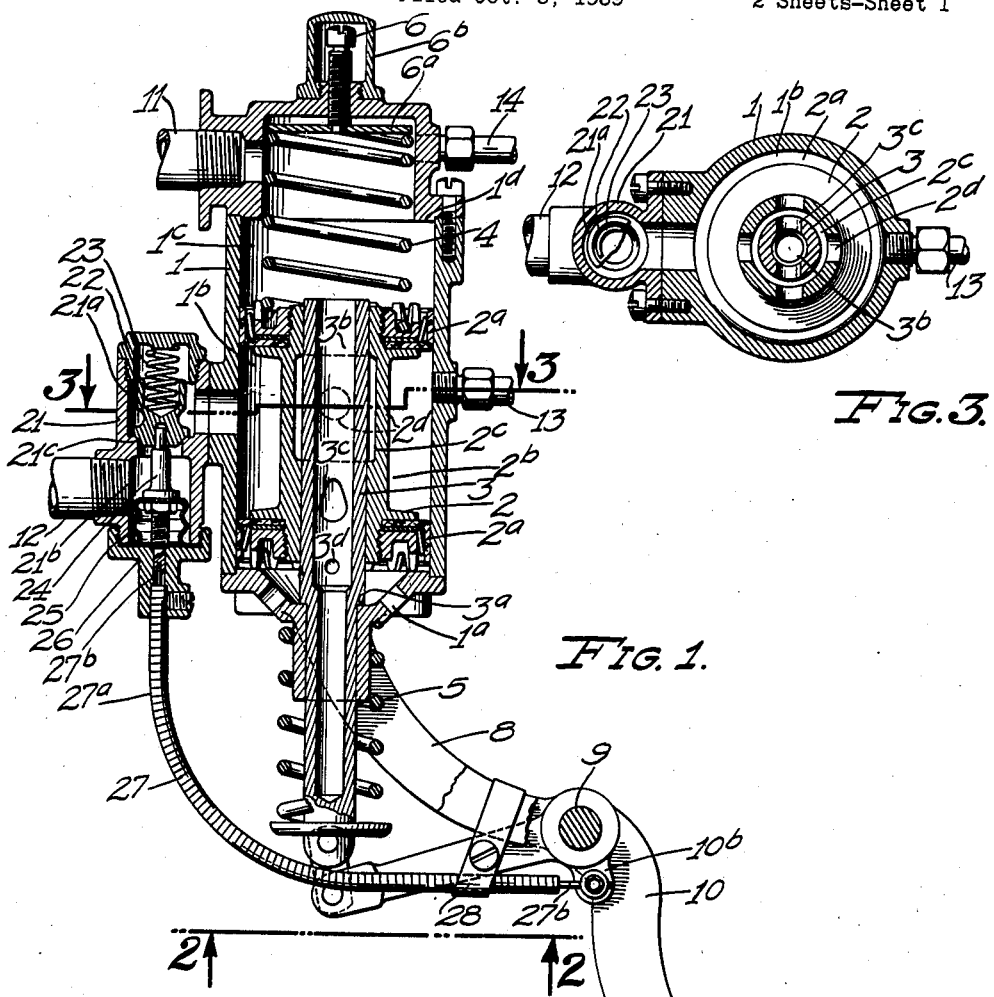
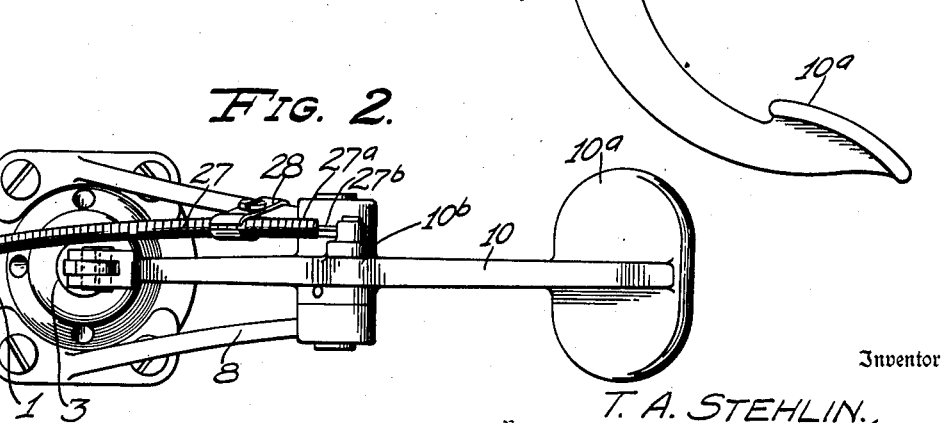
Inventor
T. A. STEHLIN.
By William B. Hall
Attorney Oct. 14, 1941.   T. A. STEHLIN   2,259,184
BRAKE CONTROL VALVE MECHANISM
Filed Oct. 5, 1939   2 Sheets-Sheet 2

Inventor
T. A. STEHLIN.
By William E. Hall
Attorney

Patented Oct. 14, 1941

2,259,184

UNITED STATES PATENT OFFICE 2,259,184

BRAKE CONTROL VALVE MECHANISM

Theodore A. Stehlin, Los Angeles, Calif., assignor to T. Clifford Melim, Honolulu, Territory of Hawaii Application October 5, 1939, Serial No. 298,080

14 Claims. (Cl. 303—54)

This invention relates to brake mechanisms, and more particularly to a brake control valve mechanism therefor. This application is a continuation in part of application Serial No. 104,071, for Vehicle wheel brake control, filed October 5, 1936, now Patent No. 2,200,659 dated May 14, 1940.

One of the principal objects of this invention is to provide a control valve mechanism for fluid pressure brakes whereby the brakes may be applied very uniformly, thus avoiding unequal brake application, which often results in skidding in land vehicles, and further avoiding unequal wear of the tires in such vehicles, and also of the brake mechanism.

Another important object of this invention is the provision of an apparatus whereby the brakes cannot be applied instantly, thus avoiding sudden shocks or jolts, but in which the brakes are applied at predetermined speed dependent, however, upon the speed of depression or manipulation of a manually controlled lever or pedal.

A further important object of this invention is the provision of means in connection with such brake control valve mechanism in which the loss of fluid pressure is reduced to a minimum when the brake mechanism is not in operation, that is, in which the fluid under pressure is shut off or sealed when the brakes are not applied.

An important object of this invention also is the provision of a brake controlling means which is particularly simple and economical of construction, operation and installation, and which will not readily deteriorate or get out of order.

With these and other objects in view as will appear hereinafter, I have devised a brake valve control mechanism of this class having certain novel features of construction, combination, and arrangement of parts and portions, as will hereinafter be described in detail and particularly set forth in the appended claims, reference being had to the accompanying drawings and to the characters of reference thereon, which form a part of this application, in which:

Fig. 1 is a side elevation, partly in section, of my fluid brake control valve mechanism, including the manual operating pedal or lever, in a preferred form of construction, shifted positions of certain parts being shown by dotted lines;

Fig. 2 is a fragmentary bottom end view thereof;

Fig. 3 is a transverse sectional view thereof taken through 3—3 of Fig. 1;

Figures 4, 5:
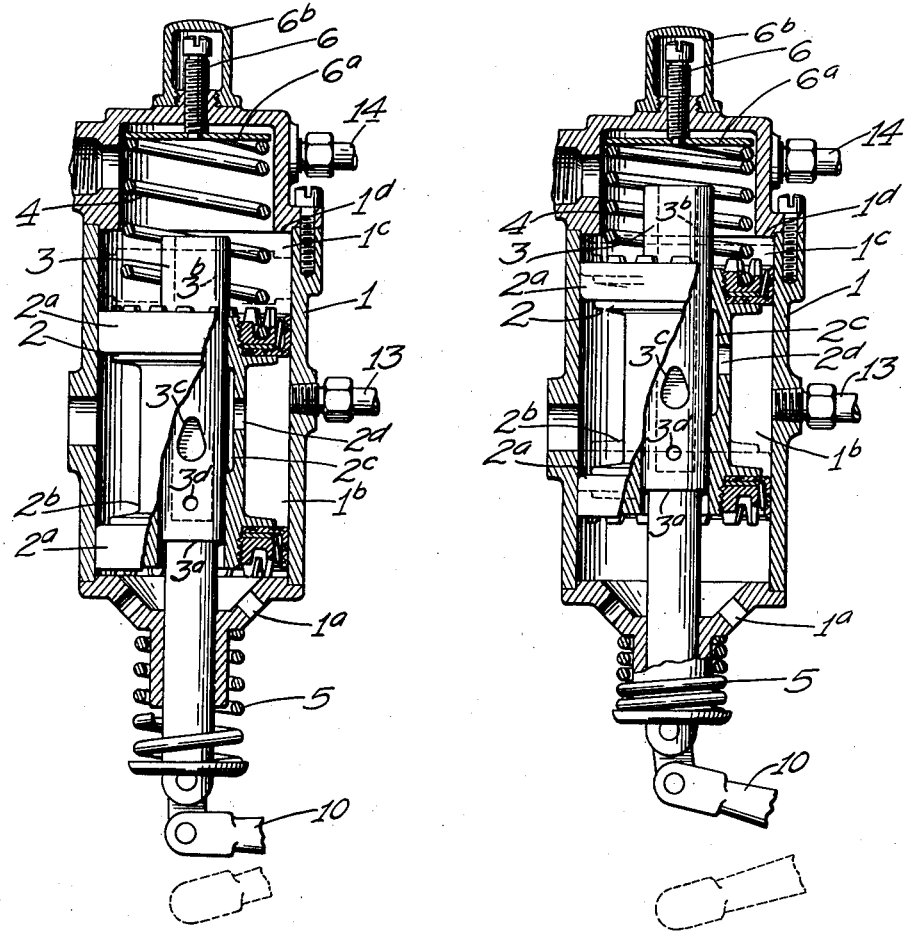
Fig. 4 is a diagrammatic view showing the operating plunger of the control valve partly depressed or forced into the valve; and, Fig. 5 is a similar diagrammatic view thereof showing the plunger wholly depressed.

I shall describe my fluid brake control valve mechanism in connection with or as may be particularly used on automobiles, trucks, streetcars, trains, or the like.

The control valve itself of my mechanism consists essentially of a cylindrical casing 1 in which is reciprocally mounted a double or opposed piston 2, a plunger 3 coaxially and reciprocally mounted with respect to the casing and the piston, and springs 4 and 5 in association respectively with the piston and the plunger for urging both in the same direction toward one end of the casing. The casing is cylindrical and preferably positioned vertically with the upper end provided with a fitting 11 connected to the brakes which are to be applied, and provided intermediate its ends with a fitting 12 connected to the desired vacuum sources. The casing is also provided with pipe connections 13 and 14 intermediate its ends, which pipe extends to pressure gages (not shown) preferably located on the instrument board of the vehicle, for indicating to the driver respectively the fluid pressure or the vacuum in the portion of the casing connection to the vacuum sources, and the pressure of the fluid which is to actuate the brakes.

The piston 2 is in the form of a spool having cup leathers $2^a$ at its opposite ends, forming an annular channel $2^b$ intermediate its ends, which annular channel is at all times connected to the pipes or fittings 12 and 13, or to the vacuum sources and the gage, except as hereinafter described. The piston is urged toward the lower end of the cylindrical casing by the compression spring 4. The plunger 3 is provided with a shoulder $3^a$ intermediate its end, which shoulder is forced against the lower end of the cylindrical casing, as a stop, by the compression spring 5 positioned outside of the casing between the casing and the lower end of the plunger. The upper end of the plunger has a central bore $3^b$, the upper end of which communicates at all times with the upper end of the casing, and therefore with the pipe or fitting 11 leading to the brakes.

The bore of the piston, through which the plunger extends, is undercut intermediate its ends, forming an annular chamber $2^c$ which communicates through a port $2^d$, with the large annular channel $2^b$. This port $2^d$ is preferably located nearer the upper end of the annular channel $2^b$ than the lower end. In the wall of the plunger is provided a port $3^c$ which, when the plunger is in its lowest position, is positioned below the annular chamber $2^c$, and which, when the plunger is shifted to its uppermost position, is never positioned above annular chamber $2^c$. The port $3^c$ is peculiarly shaped, and has been found by experiment to be made preferably as shown, namely, substantially oval in shape with the larger portion positioned below. The wall of the plunger is also provided with a port $3^d$ which is positioned immediately below the lower end of the spool or piston. The lower end of the casing 1 is also provided with a port $1^a$ which, when the plunger is in its lowermost or inoperative position, connects the atmosphere, through the plunger and the pipe or fitting 11 with the brakes and thus neutralizes any action upon the brakes.

The tension of the piston actuating spring 4 may be adjusted to vary the sensitiveness of the brake application, by varying the force which urges or causes the piston 2 to return to its normal position. Such adjustment is effected by an adjusting screw 6 extending axially through the head of the cylinder opposite the plunger 3. The inner end of the screw engages and is capable of axially adjusting a disc $6^a$ against which the outer end of the spring 4 is seated. Over the outer end of the screw 6 is a tight cap $6^b$ which seals the cylinder against the admittance of air by the adjusting screw 6.

A pair of brackets or arms 8 depend from the lower end of the casing 1 and extend preferably to the front side. On the lower end of these arms is mounted a rock shaft 9 on which is mounted and non-rotatably secured a foot pedal 10 having a backwardly extending arm $10^a$, the free end of which is pivotally connected, by a link, with the lower end of the plunger 3.

At the vacuum connection, that is, between the chamber $1^b$ of the cylinder 1, and the pipe or fitting 12, is a vacuum seal, which consists essentially of a cylindrical casing 21 having axial compartments $21^a$ and $21^b$ at its opposite ends, the former compartment communicating with the interior of the cylinder 1, while the latter communicates freely with the pipe 12. In the compartment $21^b$ is axially shiftably mounted a valve 22 which is urged, by a spring 23, against a seat $21^c$ in the wall between the two compartments. The valve 22 is raised from its seat by a floating plunger 24 which is secured to the free inner portion of a cup shaped corrugated rubber boot or shield 25, and is axially located in the chamber $21^b$. The outer open end of the shield is secured at the outer end of the cylindrical casing 21 by a cap 26. To this cap is fastened one end of the flexible tube $27^a$ of a Bowden cable, the other end of which is secured to one of the arms 8 by a clip 28. In this tube is the cable $27^b$ of the Bowden cable, one end of which is secured to a short arm $10^b$ extending from the pivotal axis of the pedal. The other end of the cable extends into the end of the plunger 24. In this manner, when the pedal is depressed, the cable $27^b$ raises the plunger 24, unseats the valve 22, and connects the interior of the cylinder 1 with the source of vacuum through the pipe 12.

In order to apply the brakes, the foot pedal 10 is depressed, unseating the valve 22, connecting the vacuum to the interior of the cylinder 1. The depressing of the foot pedal raises the plunger. (See Fig. 4.) Immediately the port $3^d$ is closed, shutting off atmospheric pressure from the brakes. As the plunger is raised slightly further, the small portion of the port $3^c$ connects with the lower end of the annular chamber $2^c$ which is connected at all times with the source of the vacuum. A partial vacuum is immediately created in the brake line, which includes the upper portion $1^c$ of the casing 1. Such partial vacuum immediately acts upon the piston 2 and tends to draw the piston upwardly against the compression of the spring 4, and tends to close the port $3^c$. If the plunger is raised no further, the action upon the brakes and the raising of the piston 2 is equalized. Consequently there is only slight movement of or application of the brakes. As the plunger is raised further, the foregoing action is repeated until the plunger is forced to the upper end of its stroke. (See Fig. 5.) The upward movement of the piston is limited by a shoulder $1^d$ at the upper end of the casing 1. Thus it is seen that the port $3^c$, and all portions thereof, are continuously or repeatedly closed by the piston 2 when the plunger is raised. Therefore, the full fluid or vacuum pressure may be applied to the brakes when the plunger is fully raised. The relative positions of the plunger and piston are shown in Fig. 4. The dotted line position of the piston shows the extreme upper position thereof when the plunger is shifted to the position shown. Rapid upward shifting of the plunger will be proportionably equalized by upward drawing of the piston. If the plunger is instantly forced its full distance upwardly full vacuum pressure is applied to the brakes. The rapidity of the brake action or application is controlled by the sizes and number of ports for communication of the vacuum or other fluid pressure, and by the tension of the spring 4 which is adjusted by the set screw 6.

When the pedal is released, the valve 22 is closed by the spring 23 and disconnects the source of vacuum from the cylinder 1, and thereby reduces to a minimum the loss of the vacuum.

Though I have shown and described a particular construction, combination and arrangement of parts and portions, and certain applications thereof, and have referred particularly to a vacuum control system, I do not wish to be limited to these, but desire to include in the scope of my invention the construction, combination and arrangement substantially as set forth in the appended claims.

I claim:

1. In a brake system for vehicle wheels, a valve mechanism for controlling connections from a fluid pressure means to a wheel brake mechanism, comprising a casing, a plunger reciprocally mounted therein, a spring between the casing and the plunger for forcing the plunger toward one end of the casing, a lever for manually shifting the plunger against the action of the spring, a piston mounted in the casing, and another spring urging the piston in the direction in which the plunger is urged by its spring, the depression of the plunger against its spring connecting the fluid pressure means with the brake mechanism and proportionately urging the piston to compress its spring and partially to reduce the connection made by the plunger.

2. In a brake system for vehicle wheels, a valve mechanism for controlling the connection from a fluid pressure means to a wheel brake mechanism, comprising a casing having its intermediate portion connected to said means and one end connected to said brake mechanism and having a passage therebetween adapted to connect said connections, a piston movably mounted in the casing, and having a passage adapted to register with said connections to the casing, a spring adapted to force the piston towards one end of the casing, a plunger movably mounted in the piston and intersecting said passage and also having a transverse passage for connecting the opposite ends of the piston passage, means for urging the plunger in the same direction as the piston is urged by its spring, and manual means for shifting the plunger, the shifting of the plunger proportionately urging the piston to compress its spring and thereby partially to reduce the connection made by the transverse passage of the plunger.

3. In a brake control valve means for controlling fluid pressure connections between a fluid pressure source and a wheel brake, comprising a casing adapted to be connected to said fluid pressure source and to said wheel brake, a piston movably mounted in the casing and having a port registering with the fluid pressure connection, a spring adapted to force the piston toward one end of the casing, a plunger movably mounted in the piston adapted normally to cover said port, means for normally urging the plunger in the same direction as the piston is urged by its spring, a manual means for shifting the plunger against the latter means, to uncover said port, the shifting of the plunger causing fluid pressure to act upon the piston, proportionably urging the piston to compress its spring and thereby partially to reduce the port opening.

4. In a brake control valve means for controlling fluid pressure connections between a fluid pressure source and a wheel brake, comprising a casing having one end adapted to be connected to the brake and the side adapted to be connected to said fluid pressure source, and having a passage adapted to connect said connections, a piston movably mounted in the casing, and having a side passage registering at all times with the side connection of the casing and the axial portion adapted to be connected with the end connection of the casing leading to the brakes, a spring adapted to force the piston towards said one end of the casing, a plunger movably mounted in the piston and intersecting said passage of the casing and having a port adapted to register with the piston passage, means for urging the plunger in the same direction as the piston is urged by its spring, and manual means for shifting the plunger against the action of the spring, the shifting of the plunger causing fluid pressure to act upon the piston, proportionably urging the piston to compress its spring and thereby partially to reduce the port opening of the plunger.

5. In a brake apparatus of the class described, valve means for controlling fluid pressure connections between a fluid pressure source and a wheel brake, comprising a casing connected to said fluid pressure source and to said wheel brake, a plunger reciprocally mounted in the casing, a piston also reciprocally mounted in the casing, separate springs urging the plunger and the piston to one end of the casing tending to close the connections between the fluid pressure source and the brakes, a lever for manually shifting the plunger against the action of its spring, the depression of the plunger against its spring connecting the connections between the fluid pressure source and the brakes and adapted proportionably to force the piston to compress its spring and partially to reduce the connection made by the plunger, and a normally closed fluid pressure shut-off valve for normally sealing the fluid pressure source from the casing, the shut-off valve being operatively connected to the lever and opened when the plunger is operated to connect the fluid pressure source with the brake.

6. In a brake control valve means for controlling fluid pressure connections between a fluid pressure source and a wheel brake, comprising a casing adapted to be connected to said fluid pressure source and to said wheel brake, a piston movably mounted in the casing and having a port registering with the fluid pressure connection, a spring adapted to force the piston toward one end of the casing, a plunger movably mounted in the piston adapted normally to move over and cover said port, means for normally urging the plunger in the same direction as the piston is urged by its spring, a manual means for shifting the plunger against the latter means, the shifting of the plunger causing fluid pressure to act upon the piston, proportionably urging the piston to compress its spring and thereby partially to reduce the port opening, and a normally closed fluid pressure shut-off valve for normally sealing the fluid pressure source from the casing, the shut-off valve being operatively connected to the manual means and operated when said plunger is shifted.

7. In a brake control valve means for controlling fluid pressure connections between a fluid pressure source and a wheel brake, comprising a casing adapted to be connected to said fluid pressure source and to said wheel brake, a piston movably mounted in the casing and having a port registering with the fluid pressure connection, a spring adapted to force the piston toward one end of the casing, a plunger movably mounted in the piston and provided with a passage, means for normally urging the plunger in the same direction as the piston is urged by its spring, a manual means for shifting the plunger against the latter means, the shifting of the plunger connecting said port and passage and thereby connecting the fluid pressure source to said brakes, the shifting of the plunger causing fluid pressure to act upon the piston, proportionably urging the piston to compress its spring and thereby partially to reduce the passage opening of the plunger, and a normally closed fluid pressure shut-off valve for normally sealing the fluid pressure source from the casing, the shut-off valve being operatively connected to the manual means and operated when said plunger is shifted.

8. In a brake control valve means for controlling fluid pressure connections between a fluid pressure source and a wheel brake, comprising a casing having one end adapted to be connected to the brake and the side adapted to be connected to said fluid pressure source, and having a passage adapted to connect said connections, a piston movably mounted in the casing, and having a side passage registering at all times with the side connection of the casing and the axial portion adapted to be connected with the end connection of the casing leading to the brakes, a spring adapted to force the piston towards said one end of the casing, a plunger movably mounted in the piston and intersecting said passage of the casing and having a port adapted to register with the piston passage, means for urging the plunger in the same direction as the piston is urged by its spring, manual means for shifting the plunger against the action of the spring, the shifting of the plunger causing fluid pressure to act upon the piston, proportionably urging the piston to compress its spring and thereby partially to reduce the port opening of the plunger, and a normally closed fluid pressure shut-off valve for normally sealing the fluid pressure source from the casing, the shut-off valve being operatively connected to the manual means and operated when said plunger is shifted.

9. In a brake system for vehicle wheels, a valve mechanism for controlling the connection from a fluid pressure means to a wheel brake mechanism, comprising a casing having its intermediate portion connected to said means and one end connected to said brake mechanism and having a passage therebetween adapted to connect said connections, a piston movably mounted in the casing, and having a passage adapted to register with said connections to the casing, a spring adapted to force the piston towards one end of the casing, a plunger movably mounted in the piston and intersecting said passage and also having a transverse passage for connecting the opposite ends of the piston passage, the transverse passage being elongated with respect to the longitudinal axis of the plunger and reduced in cross-section toward the brake connection end of the casing, means for urging the plunger in the same direction as the piston is urged by its spring, and manual means for shifting the plunger, the shifting of the plunger proportionately urging the piston to compress its spring and thereby partially to reduce the connection made by the transverse passage of the plunger.

10. In a brake control valve means for controlling fluid pressure connections between a fluid pressure source and a wheel brake, comprising a casing adapted to be connected to said fluid pressure source and to said wheel brake, a piston movably mounted in the casing and having a port registering with the fluid pressure connection, a spring adapted to force the piston toward one end of the casing, a plunger movably mounted in the piston adapted normally to cover said port, means for normally urging the plunger in the same direction as the piston is urged by its spring, a manual means for shifting the plunger against the latter means, said plunger being provided with a transverse port adapted to register with the first port when the plunger is shifted by the manual means, the shifting of the plunger causing fluid pressure to act upon the piston, proportionably urging the piston to compress its spring and thereby partially to reduce the port opening.

11. In a brake control valve means for controlling fluid pressure connections between a fluid pressure source and a wheel brake, comprising a casing adapted to be connected to said fluid pressure source and to said wheel brake, a piston movably mounted in the casing and having a port registering with the fluid pressure connection, a spring adapted to force the piston toward one end of the casing, a plunger movably mounted in the piston adapted normally to move over and cover said port, means for normally urging the plunger in the same direction as the piston is urged by its spring, a manual means for shifting the plunger against the latter means, said plunger being also provided with a transverse port adapted to register with the first port when the plunger is shifted by the manual means, the transverse port being elongated with respect to the longitudinal axis of the plunger and reduced in cross-section toward the brake connection portion of the casing, the shifting of the plunger causing fluid pressure to act upon the piston, proportionably urging the piston to compress its spring and thereby partially to reduce the port opening.

12. In a brake control valve means for controlling fluid pressure connections between a fluid pressure source and a wheel brake, comprising a casing having one end adapted to be connected to the brake and the side adapted to be connected to said fluid pressure source, and having a passage adapted to connect said connections, a piston movably mounted in the casing, and having a side passage registering at all times with the side connection of the casing and the axial portion adapted to be connected with the end connection of the casing leading to the brakes, a spring adapted to force the piston towards said one end of the casing, a plunger movably mounted in the piston and intersecting said passage of the casing and having a port adapted to register with the piston passage, the port being elongated with respect to the longitudinal axis of the plunger and reduced in cross-section toward the brake connection portion of the casing, means for urging the plunger in the same direction as the piston is urged by its spring, and manual means for shifting the plunger against the action of the spring, the shifting of the plunger causing fluid pressure to act upon the piston, proportionably urging the piston to compress its spring and thereby partially to reduce the port opening of the plunger.

13. In a brake control valve means for controlling fluid pressure connections between a fluid pressure source and a wheel brake, comprising a casing having one end adapted to be connected to the brake and the side adapted to be connected to said fluid pressure source, and having a passage adapted to connect said connections, a piston movably mounted in the casing, said piston having piston portions at its ends, there being provided a passage between the casing and piston intermediate the piston portions, said passage registering at all times with the side connection of the casing, said piston having an axial bore adapted to be connected with the end connection of the casing leading to the brakes, said bore being connected by a radial port to the space between the piston portions, a spring adapted to force the piston towards said one end of the casing, a hollow plunger movably mounted in the bore of the piston and having a transverse bore connecting the interior with the exterior of the plunger and adapted to register with the radial port, means for urging the plunger in the same direction as the piston is urged by its spring, and manual means for shifting the plunger against the action of the spring, the shifting of the plunger causing fluid pressure to act upon the piston, proportionably urging the piston to compress its spring and thereby partially to reduce the port opening of the plunger.

14. In a brake control valve means for controlling fluid pressure connections between a fluid pressure source and a wheel brake, comprising a casing having one end adapted to be connected to the brake and the side adapted to be connected to said fluid pressure source, and having a passage adapted to connect said connections, a piston movably mounted in the casing, said piston having piston portions at its ends, there being provided a passage between the casing and piston intermediate the piston portions, said passage registering at all times with the side connection of the casing, said piston having an axial bore adapted to be connected with the end connection of the casing leading to the brakes, said bore being connected by a radial port to the space between the piston portions, a spring adapted to force the piston towards said one end of the casing, a hollow plunger movably mounted in the bore of the piston and having a transverse bore connecting the interior with the exterior of the plunger and adapted to register with the radial port, the transverse port being elongated with respect to the longitudinal axis of the plunger and reduced in cross-section toward the brake connection portion of the casing, means for urging the plunger in the same direction as the piston is urged by its spring, and manual means for shifting the plunger against the action of the spring, the shifting of the plunger causing fluid pressure to act upon the piston, proportionably urging the piston to compress its spring and thereby partially to reduce the port opening of the plunger.

THEODORE A. STEHLIN.